Sept. 4, 1956 F. D. SHER 2,761,910
MAGNETIC TRANSDUCER
Filed May 2, 1955

INVENTOR
Fred D. Sher
BY Hart, Shields & Price
ATTORNEY

United States Patent Office 2,761,910

Patented Sept. 4, 1956

2,761,910

MAGNETIC TRANSDUCER

Fred D. Sher, Paramus, N. J., assignor to ACF Industries, Incorporated, New York, N. Y., a corporation of New Jersey Application May 2, 1955, Serial No. 505,219

9 Claims. (Cl. 179—100.2)

This invention relates to recording and reproducing transducers and more particularly to transducers such as are used with a magnetic recording medium.

To obtain high resolution recording from magnetic recording mediums such as tapes or drums, it is essential that the transducer or head maintain intimate and essentially unvarying contact with the surface thereof. This can be accomplished by the precision machining and mounting of a recording drum, by minimizing the mass of the head and limiting the speed of transport of the recording medium past the head so that the amplitude of spurious movements of the recording medium normal to its transport direction are minimized and by reducing the frequency thereof that at which the head can follow the spurious movements. Such limitations are not desirable in as much as the reduction in speed limits the amount of information which can be read in or out of the recording medium in a given time and there are practical limitations to the reduction of the mass of the head below which the output becomes too low and the resulting unit is too fragile for many purposes.

It is accordingly the objects of this invention to provide a magnetic transducer which is adapted for use with a recording medium having a high speed of transport, which can follow rapid spurious movements of the recording medium, which is rugged in construction, which has a relatively large electrical output and which advances the recording art generally.

According to the present invention, the magnetic transducer comprises a ferromagnetic core structure, preferably in the form of a truncated toroid whose ends are bridged by a relatively movable vane to complete a magnetic circuit which links with an electrical coil wound upon the core. The vane is yieldably urged towards the recording medium by a resilient member of an elastomeric damping material such as synthetic rubber. The portion of the vane abutting the surface of the recording mechanism is provided with a gap of non-magnetic material so that variations of the magnetic field of the recording medium are correlated with the current flow in the coil. It will be apparent that only the vane, the mass of which can be minimized, need follow the spurious movements of the recording medium so that very high transport speeds past the transducer can be employed without sacrifice of ruggedness or output from the relatively stationary core structure and coil.

These and other objects and aspects of the invention will be apparent from the following description of a specific embodiment of the invention which refers to a drawing, wherein.

Figures 1, 2, 3:
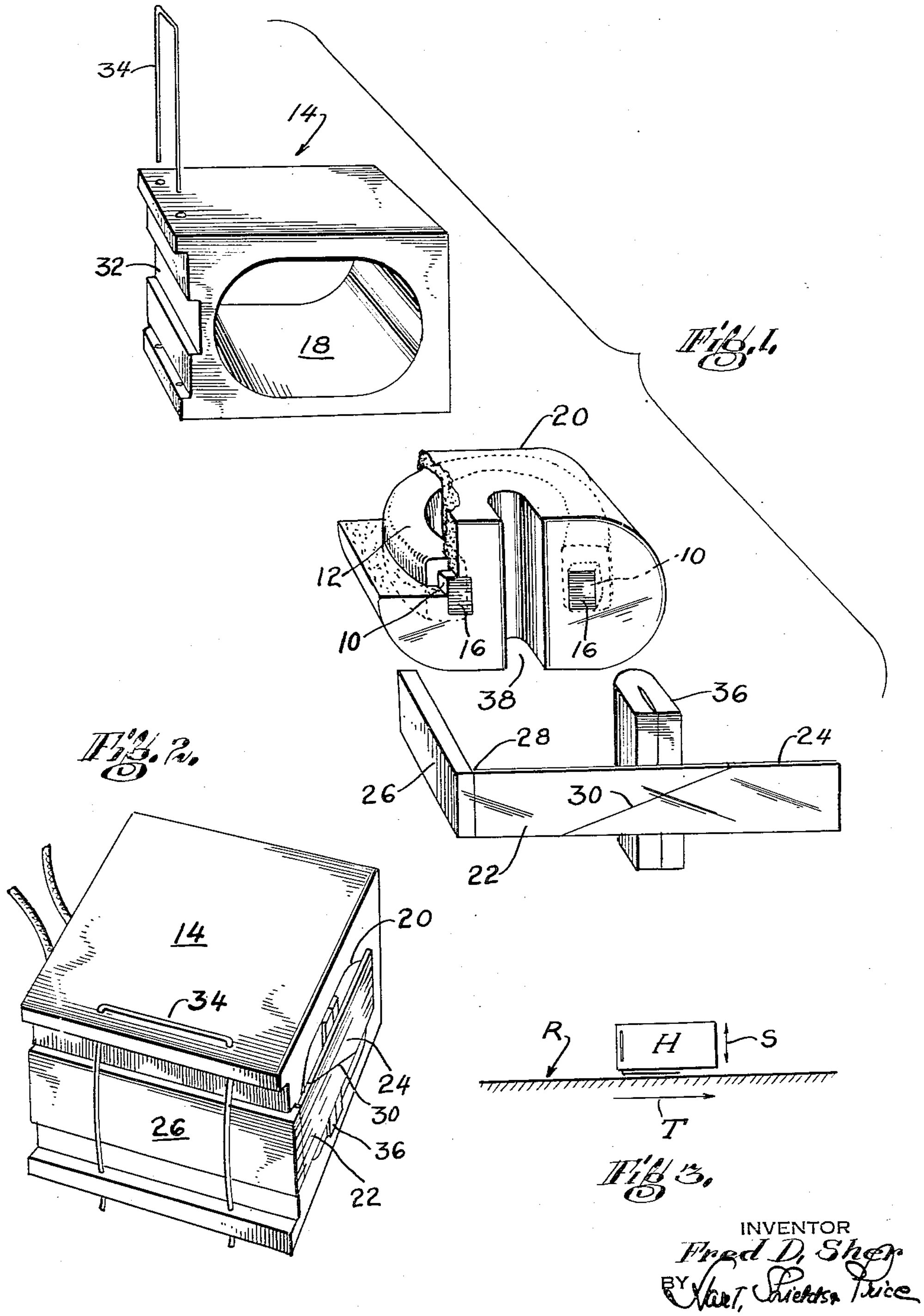
Fig. 1 is an exploded view of the transducer.
Fig. 2 is an isometric view of the transducer.
Fig. 3 is a diagrammatic view of the transducer and associated recording medium.

As is best shown in Fig. 1, the transducer comprises a core structure 10 of a magnetic material such as a sintered ceramic in the form of a truncated toroid. A multiple turn electric coil 12 is wound upon the core structure 10. The electrical coil 12 and the core structure 10 are enclosed by a casing 14 of a non-magnetic material such as brass with the ends 16 of the toroid flush with the end of the wall of the casing cavity 18 so that only the toroid ends are exposed when the cavity is filled with an encapsulating resin compound 20.

The magnetic circuit of the transducer is completed by means of a vane 22 of a ferromagnetic material, for example, a high permeability alloy such as is used for small transformer laminations. The vane comprises two portions 24 and 26 which are soldered together at 28 to form an L-shaped member. The vane portion 24 is provided with slit 30 inclined with respect to its sides which is formed by cutting the vane portion and soldering the resulting pieces together thereby to form an interruption or gap in the magnetic circuit. The other portion 26 of the vane 22 is maintained in engagement in a slot 32 in one side of the casing 14 by a U-shaped clip 34 so that the magnetic gap portion 24 bridges the toroid ends 16 of the core structure 10. The gap portion 24 of the vane 22 is yieldably urged away from the toroid ends 16 by resilient means such as the strip 36 of synthetic rubber or other elastomeric material. The strip 36 is folded back upon itself and the bent portion thereof is inserted in a recess 38 molded in the resin compound 20 so that the adjacent ends thereof abut the inner surface of the vane portion 24.

In operation, the transducer H is supported by an arm or other means (not shown) so that the outward biasing action of the rubber strip 36 brings the magnetic gap portion 24 of the vane 22 into yieldable contact with the surface of a recording medium R as is shown in Fig. 3. Although the recording medium R is shown diagrammatically as a planar surface similar to a magnetic tape, it is to be understood that the invention is not so limited and that the above described transducer is equally applicable for use with a magnetic drum or disc whose effective recording surface is transported by rotation thereof. Such recording media, which are well known to persons skilled in the art, have in addition to their transport movement T spurious movements S due to inaccuracies in their driving and supporting elements. Such spurious movements are substantially normal to the transport movement as is shown in Fig. 3. In conventional reproducing heads, the distortion is minimized by reducing the rate of transport movement, the mass of the recording head and the amplitude of the spurious movements so that the head is able to follow the spurious movements and maintain substantially constant contact pressure against the recording medium. With a transducer such as that described heretofore, the need for such precaution is materially reduced and a higher quality output of greater amplitude is obtainable because the vane 22 which follows the spurious movements is movable with respect to the remainder of the transducer so that there is no need to limit the amount of material in the core structure 10 or the number of turns of the electrical coil 12. Furthermore, the vane 22, which is the only moving element of the transducer, can be constructed with a minimum mass so that it can follow the most rapid spurious movements without difficulty.

To insure that the minute relative mechanical movements between the core structure 10 and the vane 22 do not materially change the electrical operation of the transducer, the area of the truncated toroid faces 16 are made large with respect to the cross sectional area of the vane 22 so that slight variations in the spacing of the vane and face cause only negligible changes in the reluctance of the magnetic circuit. When the transducer is used as a recording head, a varying input signal is applied to the coil 12 so that the flow of flux in the magnetic circuit and across the vane gap 30 correspondingly vary to magnetize the high magnetic retentivity material of the moving recording medium in the well-known manner. Conversely, when the transducer is used as a reproducing head, the variations of the magnetic field in the recording medium, as it is transported past the vane gap 30, cause a variation in the flux flow through the magnetic circuit and therefore in the output of the coil 12.

It should be understood that the present disclosure is for the purpose of illustration only and that this invention includes all modifications and equivalents which fall within the scope of the appended claims.

I claim:

1. A transducer for recording and reproducing the variations in the magnetic field of a moving recording medium comprising a core structure of a magnetic material having an electrical coil wound thereupon, a ferromagnetic vane with a non-magnetic gap therein for bridging the ends of the core structure to complete a magnetic circuit, and resilient means for yieldably urging the vane into contact with the recording medium so that variations in its magnetic field are correlated with the current flow in the coil, the vane being movable relatively to the core structure so as to maintain contact with the recording medium during spurious movements thereof.

2. A transducer for recording and reproducing the variations in the magnetic field of a moving recording medium comprising a magnetic core structure in the form of a truncated toroid having an electrical coil wound thereupon, a ferromagnetic vane with a non-magnetic gap therein for bridging the ends of the toroidal core structure to complete a magnetic circuit, and resilient means for yieldably urging the vane into contact with the recording medium so that variations in its magnetic field are correlated with the current flow in the coil, the vane being movable relatively to the core structure so as to maintain contact with the recording medium during spurious movements thereof.

3. A transducer for recording and reproducing the variations in the magnetic field of a moving recording medium comprising a core structure of a magnetic material having an electrical coil wound thereupon, a ferromagnetic vane with a non-magnetic gap therein for bridging the ends of the core structure to complete a magnetic circuit, and an elastomeric member interposed between the core structure and the vane for yieldably urging the vane into contact with the recording medium so that variations in its magnetic field are correlated with the current flow in the coil, the vane being movable relatively to the core structure so as to maintain contact with the recording medium during spurious movements thereof.

4. A transducer for recording and reproducing the variations in the magnetic field of a moving recording medium comprising a core structure of a magnetic material having an electrical coil wound thereupon, a ferromagnetic vane with a non-magnetic gap therein for bridging the ends of the core structure to complete a magnetic circuit, and an elastomeric strip doubled back upon itself and interposed between the core structure and the vane with the adjacent ends thereof abutting the vane for yieldably urging the vane into contact with the recording medium so that variations in its magnetic field are correlated with the current flow in the coil, the vane being movable relatively to the core structure so as to maintain contact with he recording medium during spurious movements thereof.

5. A transducer for recording and reproducing the variations in the magnetic field of a moving recording medium comprising a core structure of a magnetic material having an electrical coil wound thereupon, a casing having a cavity for enclosing said core structure so that the ends thereof are flush with the end of the cavity wall, a ferromagnetic vane with a non-magnetic gap therein for bridging the ends of the core structure to complete a magnetic circuit, and resilient means for yieldably urging the vane into contact with the recording medium so that variations in its magnetic field are correlated with the current flow in the coil, the vane being movable relatively to the core structure so as to maintain contact with the recording medium during spurious movements thereof.

6. A transducer for recording and reproducing the variations in the magnetic field of a moving recording medium comprising a core structure of a magnetic material having an electrical coil wound thereupon, a casing having a cavity for enclosing said core structure so that the ends thereof are flush with the end of the cavity wall, an insulating compound filling the casing cavity to encapsulate the core structure other than the flush ends thereof, a ferromagnetic vane with a non-magnetic gap therein for bridging the ends of the core structure to complete a magnetic circuit, and resilient means for yieldably urging the vane into contact with the recording medium so that variations in its magnetic field are correlated with the current flow in the coil, the vane being movable relatively to the core structure so as to maintain contact with the recording medium during spurious movements thereof.

7. A transducer for recording and reproducing the variations in the magnetic field of a moving recording medium comprising a core structure of a magnetic material having an electrical coil wound thereupon, an L-shaped vane of ferromagnetic material one leg of which is provided with a non-magnetic gap, the other leg being attached to the casing so that the leg having the gap bridges the ends of the core structure to complete a magnetic circuit, and resilient means for yieldably urging the vane into contact with the recording medium so that variations in its magnetic field are correlated with the current flow in the coil, the vane being movable relatively to the core structure so as to maintain contact with the recording medium during spurious movements thereof.

8. A transducer according to claim 7, wherein the magnetic gap is formed by soldering the abutting edges of two portions of the vane leg.

9. A transducer according to claim 8, wherein the magnetic gap is inclined with respect to the sides of the vane leg.

No references cited.